United States Patent [19]
Ridley et al.

[11] Patent Number: 5,613,777
[45] Date of Patent: Mar. 25, 1997

[54] IMPROVEMENTS RELATING TO RADIATION THERMOMETERS

[75] Inventors: Ian H. Ridley, Sheffield, England; Peter Fearnehough, Sheffield, United Kingdom

[73] Assignee: Land Instruments International Limited, United Kingdom

[21] Appl. No.: 460,695

[22] Filed: Jun. 2, 1995

[30] Foreign Application Priority Data

Jun. 3, 1994 [GB] United Kingdom ............... 9411160

[51] Int. Cl.$^6$ ........................................... G01J 5/08
[52] U.S. Cl. ..................... 374/130; 374/121; 356/43
[58] Field of Search ........................ 374/121, 123, 374/130, 120, 124, 131, 208; 356/43, 49

[56] References Cited

U.S. PATENT DOCUMENTS

| 2,199,082 | 4/1940 | Peters .................... 374/121 |
| 2,761,072 | 8/1956 | Wormser ................. 374/130 |
| 3,081,632 | 3/1966 | Howell . | |
| 3,745,347 | 7/1973 | DeBrey et al. ........... 374/130 |
| 4,375,333 | 3/1983 | Clark et al. ............. 356/43 |
| 4,770,528 | 9/1988 | Imura et al. ............ 374/130 |
| 5,172,978 | 12/1992 | Nomura et al. ........ 374/130 |

FOREIGN PATENT DOCUMENTS

| 1004168 | 3/1947 | France ................... 374/23 |
| 57-84322 | 5/1982 | Japan .................... 356/43 |
| 4244925 | 9/1992 | Japan . | |

OTHER PUBLICATIONS

Two sheets of drawings (Drawing Nos. 3872082 and 3872816–818), Impac Electronic GmbH ISQ4 ratio pyrometer (1987).

Primary Examiner—G. Bradley Bennett
Attorney, Agent, or Firm—Sterne, Kessler, Goldstein & Fox P.L.L.C.

[57] ABSTRACT

A radiation thermometer comprises an optical objective through which radiation to be detected passes. A beam splitter has a central region through which a central portion of the radiation which has passed through the objective passes undeflected and an outer region which reflects radiation surrounding the central portion. An eye piece receives radiation passing through the beam splitter; and a radiation detector receives radiation reflected by the beam splitter.

16 Claims, 1 Drawing Sheet

IMPROVEMENTS RELATING TO RADIATION THERMOMETERS

FIELD OF THE INVENTION

The invention relates to radiation thermometers, for example infrared thermometers.

DESCRIPTION OF THE PRIOR ART

In radiation thermometers, visual sighting systems are regularly provided to facilitate accurate aiming of the instrument at the object to be measured. Optimally, these systems are through the lens, i.e. using the same objective lens as the radiation system, to remove parallax errors. Such systems require some form of beam splitting to separate the visible and non-visible radiation (usually infrared) beams within the instrument.

Traditional methods for achieving this beam splitting have been either spectral, using spectral defining filters to transmit the visible spectrum whilst reflecting the infrared spectrum (or vice versa), or spatial in which a portion of the beam is sampled by the intrusion of a pick-off mirror.

Whilst the spectral methods offer the highest theoretical efficiencies (lowest energy losses) they require expensive components which often need to be specifically tailored to the spectral response of the different instrument type being constructed. Further, the traditional spatial methods require the secure mounting of a small and accurately aligned mirror in the beam, and an additional beam steering mechanism in order to have the visible beam exit at the rear of the instrument.

SUMMARY OF THE INVENTION

In accordance with the present invention, a radiation thermometer comprises an optical objective through which radiation to be detected passes; a beam splitter having a central region through which a central portion of the radiation which has passed through the objective passes undeflected and an outer region which reflects radiation surrounding the central portion; an eye piece for receiving radiation passing through the beam splitter; and a radiation detector for receiving radiation reflected by the beam splitter.

Typically, the central region will comprise a physical hole through the beam splitter but alternatively could be realized by masking the central region of a transparent substrate during a coating process with a reflective coating (e.g. aluminium) while leaving an outer region unmasked, and then removing the mask.

Conveniently, the eye piece is physically aligned with the central region of the beam splitter and with the objective so that the visible radiation passes undeflected through the objective to the eye piece. However, the path of the radiation could be adjusted using conventional optical systems if necessary.

The invention is particularly suited for use with infrared thermometers but could also be used with other types of radiation thermometer of known construction.

BRIEF DESCRIPTION OF THE DRAWINGS

An example of an infrared thermometer assembly according to the invention will now be described with reference to the accompanying drawings, in which.

DETAILED DESCRIPTION OF AN EMBODIMENT

Figure 1:
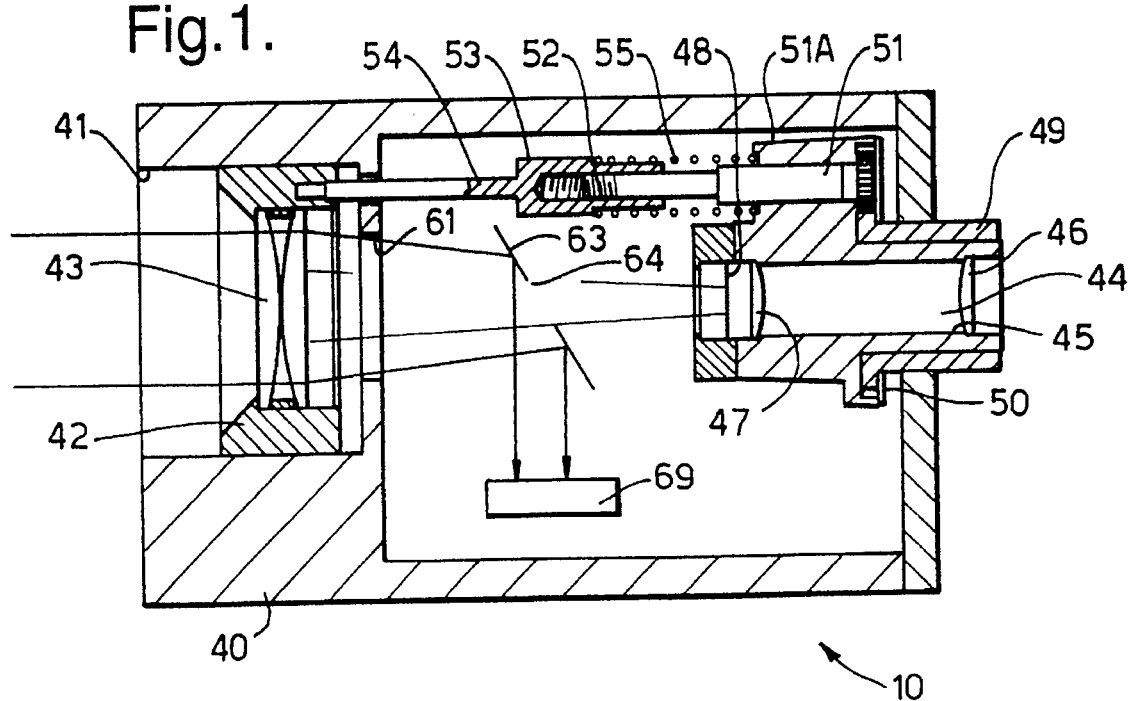
FIG. 1 is a longitudinal section through the assembly.

FIG. 1 illustrates an infrared thermometer assembly 10 having a housing 40 which at its front end has a bore 41 in which is slidably mounted a housing 42 supporting an objective lens assembly 43. The rear end of the housing 40 supports an eye piece assembly 44 having a central bore 45 at opposite ends of which are mounted a pair of lenses 46, 47 with a graticule 48 upstream of the lens 47. As seen in FIG. 1, infrared radiation entering the objective lens assembly 43 passes to a beam splitter 63 to be described with reference to FIG. 2. The beam splitter 63 has a central aperture 64 through which some of the light passes to the graticule 48 and from there to the eye piece assembly 44. Radiation surrounding the central portion is reflected by the beam splitter 63 onto an infrared detector 69.

In order to move the objective lens housing 42 relative to the housing 40, a control mechanism is provided which includes a focusing knob 49 rotatably mounted about the eye piece assembly 44 and constituting a control member, the focusing knob having a gear 50 which intermeshes with a pinion 51 rotatably mounted in a side extension 51A of the eye piece assembly. The pinion 51 terminates in a screw threaded spigot 52 which is received in a correspondingly screw threaded socket 53 of a push rod 54 secured at its other end to the objective lens housing 42.

As the knob 49 is rotated, this will rotate the pinion 51 which in turn rotates within the spigot 53 causing linear movement of the push rod and consequently linear, sliding movement of the objective lens housing 42. A compression spring 55 acts between the eye piece assembly and the push rod 54 to remove any free movement.

Figure 2:
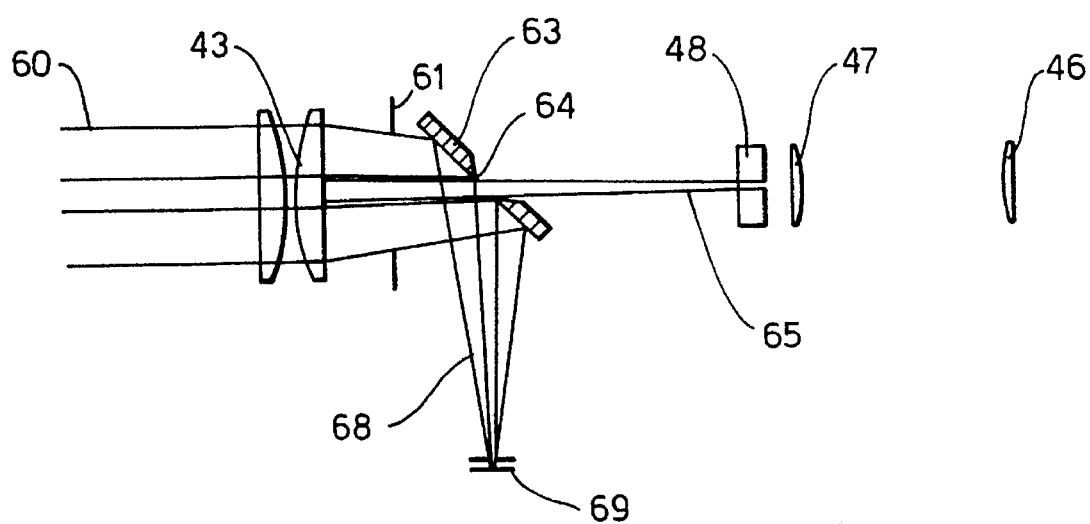
FIG. 2 illustrates the optical arrangement in more detail.

FIG. 2 illustrates the optical arrangement in more detail.

Infrared radiation 60 is received by the objective lens assembly 43 and focused onto the graticule 48. The beam splitter 63 is positioned downstream of a field stop 61 defined by part of the housing 40. The beam splitter 63 has a central aperture 64 through which a central portion 65 of the beam passes undeflected to the graticule 48 and to the field lens 47 and the eye piece lens 46. Radiation in the region surrounding the central region 65 is reflected by the beam splitter 63 as shown at 68 on to the infrared detector 69. Conveniently, the beam splitter is a transparent member which is coated in the surrounding (or outer) region with a reflective material (e.g. aluminium) and is left uncoated —the central region.

In use, the operator looks through the eye piece assembly 44 and focuses the radiation by rotating the knob 49. Once this has been achieved he then observes the image indicating the target from which infrared radiation will be received and if necessary adjusts the orientation of the housing 40 so that the thermometer is aimed at the correct part of the target. Thereafter, the operator will know that the infrared radiation received by the detector 69 has been received from the desired target.

We claim:

1. A radiation thermometer comprising:
   an optical objective through which radiation to be detected passes;
   a beam splitter having a central region through which a central portion of the radiation which has passed through said objective passes undeflected and an outer region which reflects radiation surrounding said central portion;

an eye piece for receiving radiation passing through said beam splitter;

an aperture positioned between said objective and said beam splitter; and a radiation detector for receiving radiation reflected by said beam splitter.

2. A thermometer according to claim 1, wherein said central region comprises a physical hole through said beam splitter.

3. A radiation thermometer according to claim 1, wherein said central region comprises an uncoated area of a transparent substrate.

4. A radiation thermometer according to claim 3, wherein said outer region is coated with a reflective material.

5. A thermometer according to claim 1, wherein said eye piece is physically aligned with said central region of said beam splitter and with said objective so that the visible radiation passes undeflected through said objective to said eye piece.

6. A thermometer according to claim 1, which further comprises a graticule onto which an image from the objective lens is focused.

7. A radiation thermometer according to claim 1, further comprising:

a radiation thermometer housing having front and rear ends;

an objective lens housing movably mounted to said front end of said radiation thermometer housing and supporting said objective, and said eye piece being mounted to a rear end of said radiation thermometer housing; and control means for causing relative movement between said objective lens housing and said radiation thermometer housing, said control means being connected to a manual control member for operating said control means, said control member being mounted to said radiation thermometer housing at a position spaced from said objective lens housing.

8. A radiation thermometer according to claim 7, wherein said control member is positioned at said rear of said radiation thermometer housing.

9. A radiation thermometer according to claim 7, wherein said control member comprises a tube which is rotatably mounted about said eye piece.

10. A radiation thermometer according to claim 8, wherein said control member comprises a tube which is rotatably mounted about said eye piece.

11. A radiation thermometer according to claim 7, wherein said control means includes a pair of members connected together by a screw threaded spigot/socket connection, whereby rotation of one of said members connected to said control member causes linear movement of the other member which is connected to said objective lens housing.

12. A radiation thermometer comprising:

an optical objective through which radiation to be detected passes;

a beam splitter having a central region through which a central portion of the radiation which has passed through said objective passes undeflected and an outer region which reflects radiation surrounding said central portion;

an eye piece for receiving radiation passing through said beam splitter;

a graticule onto which an image from said objective lens is focused; and a radiation detector for receiving radiation reflected by said beam splitter.

13. A thermometer according to claim 12, wherein said central region comprises a physical hole through said beam splitter.

14. A radiation thermometer according to claim 12, wherein said central region comprises an uncoated area of a transparent substrate.

15. A radiation thermometer according to claim 14, wherein said outer region is coated with a reflective material.

16. A thermometer according to claim 12, wherein said eye piece is physically aligned with said central region of said beam splitter and with said objective so that visible radiation passes undeflected through said objective to said eye piece.

* * * * *